United States Patent
Manz

(10) Patent No.: US 10,999,696 B1
(45) Date of Patent: *May 4, 2021

(54) DISTRIBUTED GEOSPATIAL COMMUNICATIONS SYSTEM FOR UAV MONITORING

(71) Applicant: U.S. Government as Represented by the Secretary of the Army, Dover, NJ (US)

(72) Inventor: Paul Manz, Andover, NJ (US)

(73) Assignee: U.S. Government as Represented by the Secretary of the Army, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/233,344

(22) Filed: Dec. 27, 2018

Related U.S. Application Data

(63) Continuation-in-part of application No. 16/046,127, filed on Jul. 26, 2018, now abandoned, which is a
(Continued)

(51) Int. Cl.
*H04W 56/00* (2009.01)
*H04W 4/021* (2018.01)
(Continued)

(52) U.S. Cl.
CPC .............. *H04W 4/021* (2013.01); *H04B 7/14* (2013.01); *H04W 40/20* (2013.01); *H04W 4/02* (2013.01); *Y02D 30/70* (2020.08)

(58) Field of Classification Search
CPC ....... H04W 4/021; H04W 40/20; H04W 4/02; H04B 7/14
(Continued)

(56) References Cited

U.S. PATENT DOCUMENTS

| | | | |
|---|---|---|---|
| 6,625,135 B1* | 9/2003 | Johnson | H04W 16/18 370/332 |
| 2005/0271300 A1* | 12/2005 | Pina | G06K 9/522 382/294 |

(Continued)

OTHER PUBLICATIONS

Wilson, J.R. The new world of counter-drone technology. Military & Aerospace Electronics, Nov. 1, 2018, [online], [retrieved on Feb. 23, 2020]. Retrieved from the Internet <https://www.militaryaerospace.com/unmanned/article/16707131/the-new-world-of-counterdrone-technology>.

(Continued)

*Primary Examiner* — Sai Ming Chan
(74) *Attorney, Agent, or Firm* — John P. DiScala

(57) ABSTRACT

A method on a first mobile node for facilitating exchange of pertinent data between mobile nodes over a wireless communications network can be provided. The method can include establishing, by the first mobile node, a wireless network connection with at least one other mobile node inside a predefined geospatial area, wherein the wireless network connection is established over the wireless communications network. The method can further include determining that a future position of the first mobile node is outside the predefined geospatial area and transmitting pertinent data residing on the first mobile node over the wireless communications network exclusively to the at least one other mobile node inside the predefined geospatial area, wherein the pertinent data is associated with the predefined geospatial area.

20 Claims, 5 Drawing Sheets

Related U.S. Application Data continuation of application No. 15/959,033, filed on Apr. 20, 2018, now abandoned, which is a continuation of application No. 14/529,512, filed on Oct. 31, 2014, now Pat. No. 9,980,088, which is a continuation of application No. 12/639,279, filed on Dec. 16, 2009, now Pat. No. 8,891,444.

(60) Provisional application No. 61/140,129, filed on Dec. 23, 2008.

(51) Int. Cl.
    *H04W 40/20*     (2009.01)
    *H04B 7/14*     (2006.01)
    *H04W 4/02*     (2018.01)

(58) Field of Classification Search
    USPC .......................................................... 370/328
    See application file for complete search history.

(56) References Cited

U.S. PATENT DOCUMENTS

| | | | |
|---|---|---|---|
| 2007/0131754 A1* | 6/2007 | Brandon | G07C 3/00 235/375 |
| 2007/0293996 A1* | 12/2007 | Mori | G01C 21/005 701/23 |
| 2010/0070124 A1* | 3/2010 | Yeager | G05D 1/0022 701/25 |

OTHER PUBLICATIONS

Wilson, J.R. The dawn of counter-drone technologies. Military & Aerospace Electronics, Nov. 1, 2016, [online], [retrieved on Feb. 23, 2020]. Retrieved from the Internet <https://www.militaryaerospace.com/unmanned/article/16708899/the-dawn-of-counterdrone-technologies?cmpid=enl_mae_wrapup_2017-03-10&email_address=paul.manz%40us.army.mil&eid=288662913&bid=1689468>.

Brown, Jennings, AT&T and NASA to Build National Drone Tracking System; Vocativ, Nov. 15, 2016, [online], [retrieved on Feb. 23, 2020], Retrieved from the Internet <https://www.vocativ.com/376085/att-nasa-drone-tracking/index.html>.

Drone Detection & Defense Systems—DroneWatcherAPP, Product Information [online]. DeTect, Inc., Jul. 11, 2017, [retrieved on Feb. 23, 2020]. Retrieved from the Internet <https://detect-inc.com/drone-detection-defense-systems/>.

Giaritelli, Anna. Drone Killer weapon wows techies, law enforcement at Border Security Expo. Washington Examiner, Feb. 1, 2018, [serialonline], [retrieved on Feb. 23, 2020], Retrieved from the Internet <https://www.washingtonexaminer.com/drone-killer-weapon-wows-techies-law-enforcement-at-border-security-expo>.

Friedberg, Susan. Introducing Drone Detection in the Cloud. Corporate blog entry [online]. Dedrone GmbH, Jul. 12, 2018, [retrieved on Feb. 23, 2020]. Retrieved from the Internet <https://www.dedrone.com/blog/introducing-drone-detection-in-the-cloud>.

DroneSentinel—Integrated Drone Detection Solution, Product Information [online]. Droneshleid, [retrieved on Feb. 23, 2020]. Retrieved from the Internet <https://www.droneshield.com/sentinel>.

\* cited by examiner

DISTRIBUTED GEOSPATIAL COMMUNICATIONS SYSTEM FOR UAV MONITORING

CROSS-REFERENCE TO RELATED APPLICATIONS

This application is a continuation-in-part of U.S. patent application Ser. No. 16/046,127 filed Jul. 26, 2018 which is itself a continuation of U.S. patent application Ser. No. 15/959,033, filed Apr. 20, 2018 which is a continuation of U.S. patent application Ser. No. 14/529,512 filed on Oct. 31, 2014, now U.S. Pat. No. 9,980,088, issued May 22, 2018, which is a continuation of U.S. patent application Ser. No. 12/639,279, filed Dec. 16, 2009, now U.S. Pat. No. 8,891,444, issued Nov. 18, 2014, which claims the benefit under 35 USC § 119(e) of U.S. provisional patent application 61/140,129 filed on Dec. 23, 2008, all of which are incorporated by reference in their entirety.

STATEMENT OF GOVERNMENT INTEREST

The inventions described herein may be manufactured, used, imported, sold and licensed by or for the Government of the United States of America without the payment or any royalty thereon.

FIELD OF THE INVENTION

The invention disclosed broadly relates to the field of communications and data management and more specifically to the field of data management over a distributed geospatial communications system.

BACKGROUND OF THE INVENTION

One of the salient features of today's modern organizations on a global, national, regional and local level is the ability to leverage information technology to command and control systems in real or near-real time. Advances in the technologies that integrate sensor and communications systems, for instance, facilitate determination of the precise location of mobile vehicles. Various modern information systems permit such location determination, including space, airborne, terrestrial and marine-based command and control systems.

Every vehicle equipped with such a command and control system is able to determine the location using geospatial positioning technology such as the global positioning system (GPS), the long range navigation (LORAN) system, or any others, and then report that vehicle's information to higher command structures/systems using secure wireless linkages. Vehicles equipped with command and control systems also receive a variety of messages from higher command structures/systems, including the known locations of other related vehicles and other unknown or suspected locations of non-related vehicles. Command and control systems also allow vehicles to send and receive warning messages and in turn permit, for instance, the alerting of related vehicles about such significant events whether developing or in progress. Various U.S. patents disclose the networking of mobile nodes for the purpose of sharing information. Two pertinent U.S. patents in this area are described below.

U.S. Pat. No. 7,049,952 discloses a system for detecting the occurrence of anomalies, includes a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to query its adjacent nodes to assess the status of the adjacent nodes and the communication links.

U.S. Pat. No. 6,930,596 discloses a system for detecting the occurrence of anomalies, includes a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to query its adjacent nodes to assess the status of the adjacent nodes and the communication links.

The above-described systems rely on the proper management and functioning of integrated databases. Much of the current art on database management systems revolves around the idea of building massive repositories of data, and resolving the complex synchronization issues that arise among them. Though some work has been done in the area of distributed embedded database management systems, it is focused on the notion that these embedded devices act as a sort of cache to address the data needs of the user when there is no connectivity to a dedicated server. The current art, therefore, requires that functioning of and access to the master data stores (such as a central database in communication with a central server) are required in order for the distributed system to work. Situations arise, however, where access to a central (main) database is unavailable, yet there remains an urgent need for utilization of the system (and particularly affected individual, i.e., local, nodes).

Therefore, there is a need to overcome the deficiencies with the prior art and more particularly for a more efficient way to facilitate the exchange of pertinent data between mobile nodes over a communications network even in the absence of a dedicated central data store.

Further, unmanned aerial vehicles (UAVs) and similar devices are becoming a ubiquitous presence. Outside of military operations, these devices were traditionally limited to hobbyists and law enforcement. However, UAVs, also sometimes called Drones, are now utilized in many industries for a variety of functions, including the surveillance and monitoring of area and the distribution of material and items.

With the increase in use of UAVs, there is also an increased fear that UAVs will be used for unauthorized, criminal or even terrorist purposes. There is now a desire for users to monitor the presence of UAVs in their area and to receive and provide information regarding those UAVs. Accordingly, there is a need to leverage systems and methods for facilitating the efficient exchange of pertinent data between mobile nodes, including hierarchical and peer-to-peer nodes, for the task of monitoring UAVs.

SUMMARY OF INVENTION

Embodiments of the present invention address deficiencies of the art in respect to data management over a distributed geospatial communications system and provide a novel and non-obvious method, computer system and computer program product for facilitating exchange of pertinent data between mobile nodes over a wireless communications network. In an embodiment of the invention, a method on a first mobile node for facilitating exchange of pertinent data between mobile nodes over a wireless communications network can be provided. The method can include establishing, by the first mobile node, a wireless network connection with at least one other mobile node inside a predefined geospatial area, wherein the wireless network connection is established over the wireless communications network. The method can further include determining that a future position of the first mobile node is outside the predefined geospatial area and transmitting pertinent data residing on the first mobile node over the wireless communications network exclusively to the at least one other mobile node inside the predefined geospatial area, wherein the pertinent data is associated with the predefined geospatial area.

In another embodiment of the invention, an alternative method on a first mobile node for facilitating exchange of pertinent data between mobile nodes over a wireless communications network can be provided. The method can include determining, by the first mobile node, that a current position of the first mobile node is within a predefined geospatial area. The method can further include establishing a wireless network connection with at least one other mobile node inside the predefined geospatial area, wherein the wireless network connection is established over the wireless communications network. The method can further include transmitting a query for pertinent data over the wireless communications network exclusively to at least one other mobile node inside the predefined geospatial area, wherein the pertinent data is associated with the predefined geospatial area and receiving pertinent data residing on at least one other mobile node over the wireless communications network.

In a general embodiment, the method of the present invention provides for the transfer of data between mobile nodes, wherein the data is particular to a predefined geospatial area. More particularly, the method involves the establishment of a wireless network connection between a first mobile node situated within a predefined geospatial area and a second mobile node, the determination—by the first mobile node—that the first mobile node will be outside of the geospatial area at some future time; and transmitting the pertinent data from the first mobile node to the second mobile node via the wireless network connection. Accordingly the data which is particular to the geospatial area is transmitted or "handed off" to the second wireless node which is either situated in the geospatial area or about to be situated in the predefined area. In this inventive manner—end in sharp contrast to prior art methods—the data is transmitted directly from the first node to the second node without any centralized databases such that the data is substantially always resident and effectively persists in the geospatial area independent of the presence of a dedicated traditional central data repository.

In another embodiment of the invention, a method monitoring unmanned vehicles with a plurality of peer-to-peer mobile nodes can be provided. The method can include determining that a position of the first mobile node is within the predefined geospatial area; establishing, by the first mobile node, a wireless network connection with at least one other mobile node inside a predefined geospatial area, wherein the wireless network connection is established over the wireless communications network. The method can further include the first mobile node requesting pertinent data of the second mobile node, via the established direct wireless communications network, wherein the pertinent data is associated with one or more unmanned vehicles associated with the predefined geospatial area and wherein the transmitted pertinent data remains available to each mobile device within the predefined geospatial area.

In another embodiment of the invention, a network for providing geospatial communications between a plurality of peer-to-peer mobile nodes to monitor unmanned vehicles can be provided. The network includes a first mobile node and a second mobile node capable of peer-to-peer communications. The first mobile node determines a current location of the first mobile node relative to a predefined geospatial area. Upon determination by the first mobile node that the current location is situated within the predefined geospatial area, the first mobile node establishes direct wireless communication with a second mobile node of the plurality of mobile nodes. The first mobile node requests pertinent data of the second mobile node, via the established direct wireless communication wherein the pertinent data is associated with one or more unmanned vehicles associated with the predefined geospatial area and wherein the transmitted pertinent data remains available to each mobile device within the predefined geospatial area.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION

Embodiments of the present invention address deficiencies of the art in respect to data management over a distributed geospatial communications system and provide a novel and non-obvious method, computer system and computer program product for facilitating exchange of pertinent data between mobile nodes over a wireless communications network. The present invention overcomes the problems with the prior art by providing a system of mobile devices operable to spontaneously form ad-hoc networked distributed data repositories with or without connectivity to a central data repository. This is advantageous over the prior art as it removes the requirement for a central data depository, thereby providing an additional degree of freedom for the overall system.

The present invention provides systems and methods for identifying, monitoring, tracking and providing alerts regarding unmanned vehicles (UVs). While throughout this specification, the system and methods will be described in the context of unmanned aerial vehicles (UAVs) or Drones, unmanned vehicles are not limited to UAVs or drones. Unmanned vehicles may include any similar tele-operated, semiautonomous, and/or autonomous systems and can include vehicles designed to operate on or below land, in the air or space, submerged or on the surface of a body of water or some combination of these environments. A distributed geospatial communications system is leveraged to facilitate the exchange of pertinent data regarding unmanned vehicles and other such systems using a spontaneously formed ad-hoc network.

Moreover, the present invention enables networked mobile nodes to automatically pick up and drop off data pertaining to a predefined geospatial area when entering or leaving the predefined geospatial area, thereby ensuring that the most pertinent data is perpetually at hand for each mobile device while within the predefined geospatial area. Again, this is advantageous as it provides an effective method of maintaining, sharing, and disseminating pertinent information across a wireless communications network. This is further advantageous because it reduces the search space for data being requested, thereby reducing the processing burden of finding pertinent data and reducing bandwidth use.

Further, in the application of monitoring UAVs and other such systems described above, the information pertaining to these systems in a geospatial area is resident in the geospatial area where it is most useful.

Figure 1:
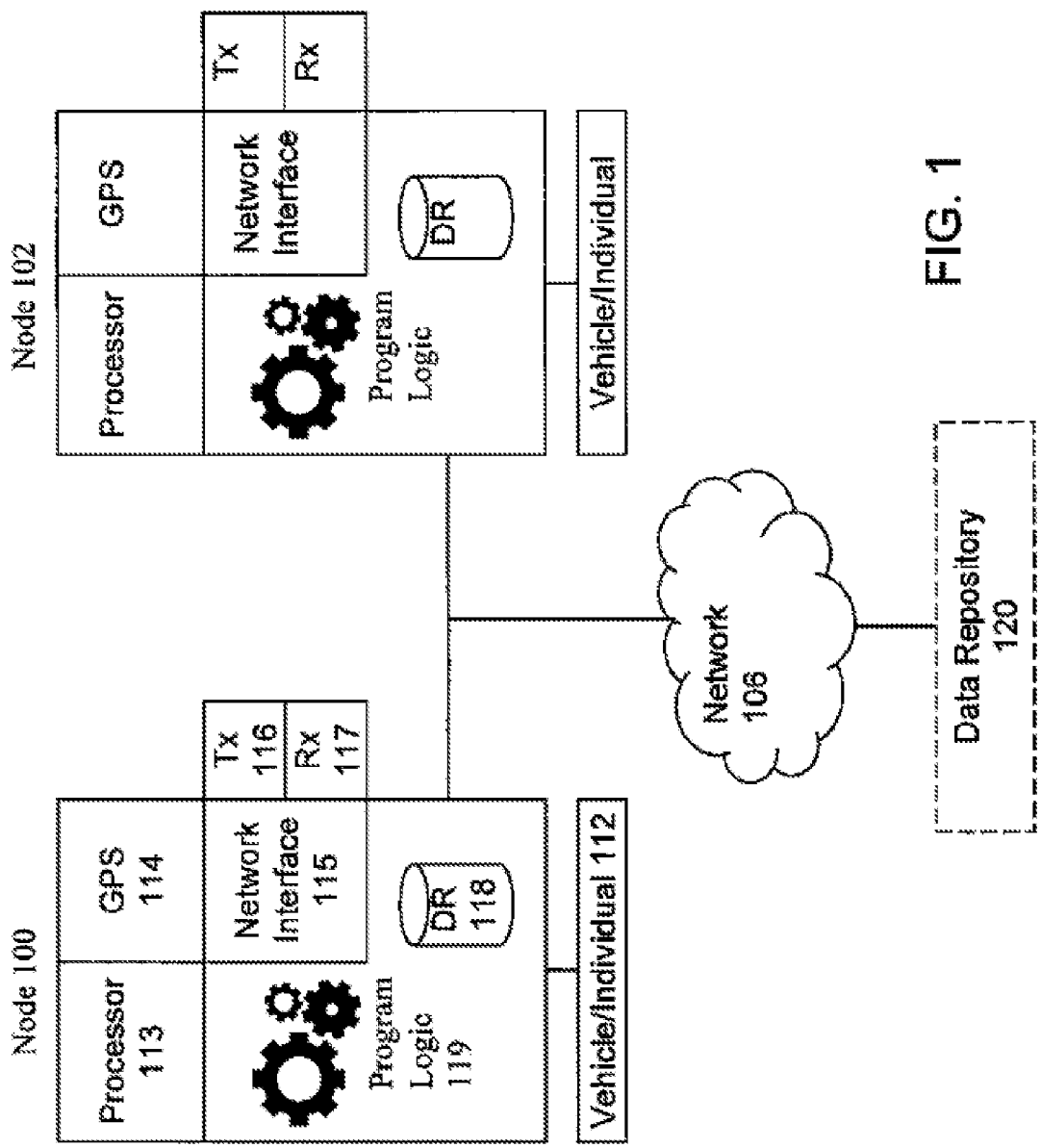
FIG. 1 an illustration of a block diagram showing the network architecture of a distributed geospatial communications system in accordance with the principles of the present invention.

Referring now to the drawing figures in which like reference designators refer to like elements, there is shown in FIG. 1 an illustration of a block diagram showing the network architecture of a distributed geospatial communications system in accordance with the principles of the present invention. FIG. 1 shows an embodiment of the present invention wherein mobile nodes 100-102 interact with each other, as well as data repository 120, over a communications network 106, which can be a circuit switched network, a packet switched network and/or a wireless communications network, such as a cellular phone radio frequency network. Network 106 may be a centralized communications network with a central infrastructure or, alternatively, may represent, or additionally support, a peer-to-peer network wherein individual nodes network directly with each other.

FIG. 1 shows a mobile node 100 in conjunction with a vehicle 112 such as a car or a tank or an individual 112. The mobile node 100 may comprise a unit that is coupled to a vehicle but that may be removed from the vehicle by an individual and thereafter be carried by the individual. The mobile node 100 includes a processor 113, a geospatial positioning device 114, such as a Global Positioning System (GPS) radio device, a network interface 115, a network interface transmitter 116 and a network interface receiver 117. The network interface 115, along with transmitter 116 and receiver 117, interface with communications network 106. The mobile node 100 also includes a data repository 118 for storing data catalogued by various attributes, such as geospatial data, temporal data, subject matter data, and the like. The mobile node 100 also includes program logic 119 accessed by processor 113, wherein the program logic 119 comprised computer source code, scripting language code or interpreted language code that is compiled to produce computer instructions that perform various functions of the present invention. FIG. 1 shows an additional mobile node 102 which may represent any number of additional mobile nodes with the ability to connect to the communications network 106, in addition to the ability to network directly with each other over a wireless radio frequency medium.

Data repository 120 may include a database server executing a database management system that delivers data to clients in a client-server paradigm. Data repository 120 delivers data based on search parameters or querying information provided by a client. It should be noted that although FIG. 1 shows only one dedicated data repository 120, the system of the present invention supports any number of dedicated data repositories connected via network 106. Further, the data repository 120 may be centralized in one location or distributed among multiple data repositories connected via network 106. Alternatively, the system of the present invention supports zero dedicated data repositories connected via network 106. In one embodiment of the present invention, the database management system is a client-server application that may include a client portion that resides on mobile nodes 100-102 and a server portion that resides on data repository 120. In another embodiment of the present invention, the data repository 120 delivers to a mobile node an application embodying a client portion that resides on the mobile node. In a preferred embodiment, data repository 120 is stationary.

Figure 2:
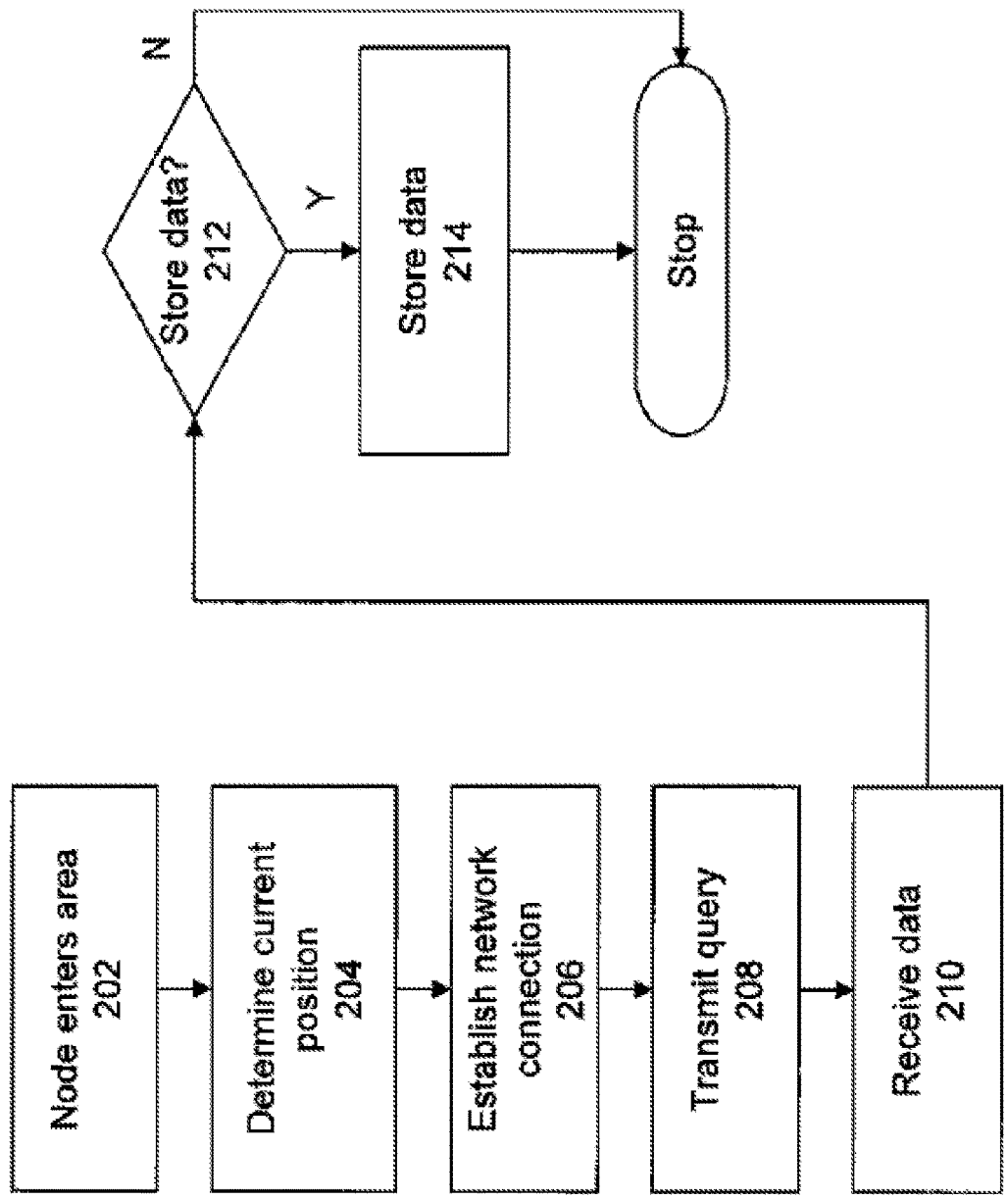
FIG. 2 is a flow chart describing the control flow of the process undertaken by a mobile node when entering a predefined geospatial area, in accordance with one embodiment of the present invention.

FIG. 2 is a flow chart describing the control flow of the process undertaken by a mobile node when entering a predefined geospatial area, in accordance with one embodiment of the present invention. The flow chart of FIG. 2 is described in association with FIG. 1, which shows an illustration of a block diagram showing the network architecture of a distributed geospatial communications system in accordance with the principles of the present invention.

FIG. 2 begins with the step 202 wherein a first mobile node, such as nod 100, enters a predefined geospatial area, such as a predefined land area. In step 204, the logic 119 is used to determine the current position of the node 100. In one embodiment, logic 119 reads a location stored by GPS 114 to make the determination of step 204. Next, in step 206, the node 100 establishes a wireless network connection, using network interface 115, with at least one other mobile node, such as node 102, inside the predefined geospatial area, wherein the wireless network connection is established over the wireless communications network 106. In one embodiment of step 206, the node 100 establishes a network connection exclusively with nodes that are only within the predefined geospatial area.

Next, in step 208, the logic 119 of node 100 transmits, via transmitter 116, a query for pertinent data over the wireless communications network 106 exclusively to the at least one other mobile node, such as node 102, inside the predefined geospatial area. In one embodiment, the term pertinent data refers to data that is associated with the predefined geospatial area. For example, the data may be about or otherwise pertain to the predefined geospatial area. In another embodiment, the term pertinent data refers to data that is associated with at least one of the following: the predefined geospatial area, a predefined temporal description and a predefined subject matter description. In step 210, the node 100 receives, via receiver 117, pertinent data from the at least one other mobile node over the wireless communications network 106.

In step 212, the logic 119 of node 100 determines whether to store the pertinent data that was received, wherein the determination may be on a variety of parameters, such as an amount of free data storage space on the node 100. Additionally, the presence of a prior version of the pertinent data on the node 100 may also be taken into account. Also, the node 100 may decide to delete expired data in data repository 118 of node 100 to make room for the new pertinent data, if the priority of the new pertinent data is higher or the new pertinent data is more pertinent that the expired data. Further, based on the aforementioned parameters, the node 100 may decide to modify parameters for deeming data pertinent, such as shrinking the area of interest represented by the parameters.

If the determination of step 212 is positive, then the pertinent data is stored in data repository 118 of node 100 in step 214. It should be noted that node 100 may alternatively interact with dedicated data repository 120 instead of node 102.

Figure 3:
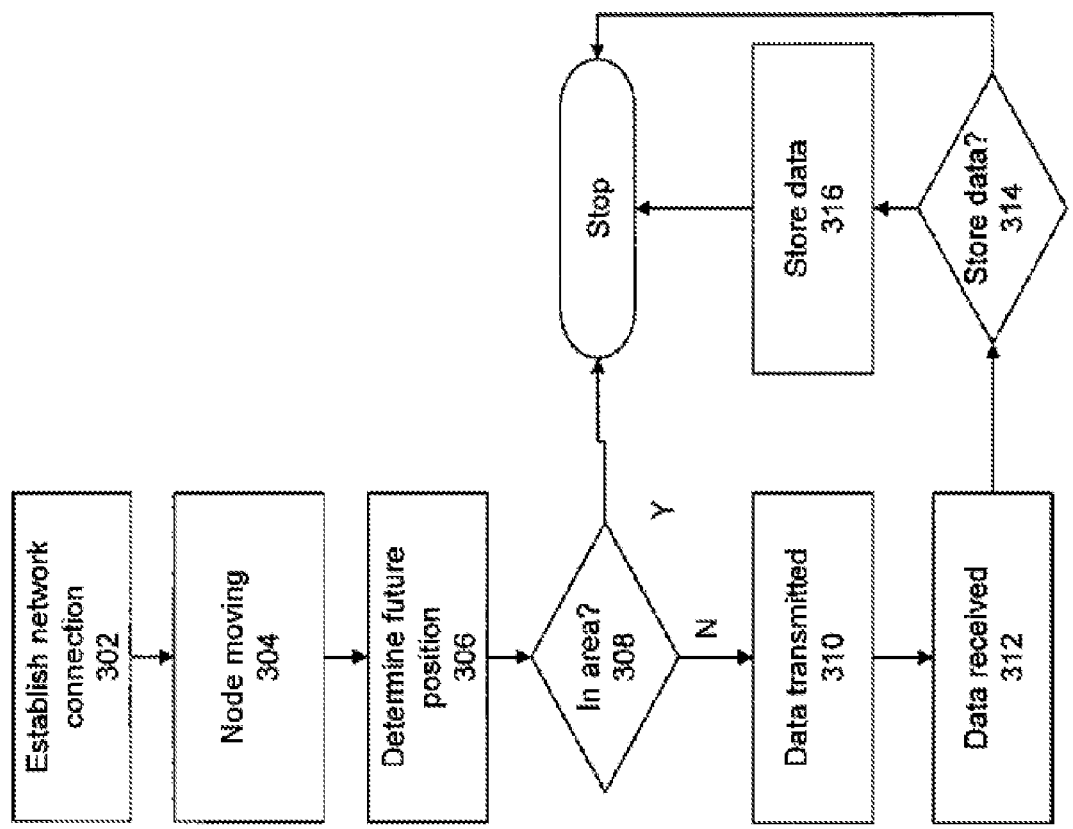
FIG. 3 is a flow chart describing the control flow of the process undertaken by a mobile node when exiting a predefined geospatial area, in accordance with one embodiment of the present invention.

FIG. 3 is a flow chart describing the control flow of the process undertaken by a mobile node when exiting a predefined geospatial area, in accordance with one embodiment of the present invention. FIG. 3 begins with step 302, wherein the node 100 establishes a wireless network connection, using network interface 115, with at least one other mobile node, such as node 102, inside the predefined geospatial area, wherein the wireless network connection is established over the wireless communications network 106. In one embodiment of step 302, the node 100 establishes a network connection exclusively with nodes that are only within the predefined geospatial area.

In step 304, node 100 is moving towards exiting a predefined geospatial area. In step 306, the logic 119 is used to determine the future position of the node 100. In one embodiment, logic 119 reads a current location and speed stored by GPS 114 to make the determination of step 304. In step 308, the logic 119 determines whether the future position is within the predefined geospatial area.

If the result of the determination of step 308 is negative, then in step 310, the logic 119 of node 100 transmits, via transmitter 116, all pertinent data in data repository 118 of node 100 over the wireless communications network 106 exclusively to the at least one other mobile node, such as node 102, inside the predefined geospatial area. In step 312, the node 102 receives the pertinent data from node 100 over the wireless communications network 106. In step 314, the logic of node 102 determines whether to store the pertinent data that was received, similar to step 212. If so, data is stored in step 316. It should be noted that node 100 may alternatively interact with dedicated data repository 120 instead of node 102.

A feature of note is the ability of the node 100 to transmit pertinent data to more than one other node 102 in step 310 above. In one embodiment, the pertinent data is broadcast by node 100 to all other nodes with which node 100 has a network connection within the predefined geospatial area. Upon reception by the multiple receiving nodes, it is decided by the receiving nodes, either individually or collectively, which nodes, if any, will be storing the pertinent data. The process undertaken for deciding whether to store the pertinent data that was received is described in more detail in step 212, as executed by the logic 119 of node 100.

In one embodiment, nodes 100-102 have the ability to network directly with each other in the absence of a central data repository such as data repository 120. Further, nodes 100-102, have the ability to determine the priority level of pertinent data and the ability to determine which nodes are best suited to relay pertinent data, thereby allowing priority knowledge to be shared expeditiously among the mobile nodes. Also, nodes 100-102 are operable to query the system so as to determine the status of surrounding local nodes. In the event that the query determines that a local node that is currently connected to a dedicated server detects via the query that a neighboring local node is unable to connect to any dedicated server, the node in connection with a dedicated server is operable to selectively act as either a relay of data for the centralized server, or act as a server in its own right for the neighboring node unable to connect to any servers. Thus, the system of the present invention ensures that the data needs of all nodes within the system are addressed, regardless of ad-hoc network partitioning.

Additionally, each node is operable to selectively synchronize some or all of its onboard stored data with conventional data stores (stored on or in communication with data repository 120). This is desirable, as traditional data storage means and systems (such as those in communication with the data repository 120) offer significantly greater storage and processing power than the individual nodes. Thus, the present invention can leverage traditional centralized data storage systems (such as centralized, stationary computer data storage means 120) when the required connectivity exists. Also, nodes may be configured such that time critical data is transmitted to only a specific designated portion of the system. For example, while some time critical information may need to reach every node, other information may only pertain to those nodes within a particular region or with a specific user profile, and thus that information may only be relayed to those pertinent nodes. This embodiment enables conservation of valuable bandwidth, and consequently higher transmission speeds throughout the system.

In another embodiment, each information item (e.g., data packet transmitted by a data repository 120 or node 100-102) is tagged with necessary metadata. Such metadata may include, but is not limited to, the criticality of the data (information), the identity of the data source, the confidence level of the data source, the geospatial region and time interval to which the data applies, the time when the data was last updated, and the type of data it is. Such metadata enables the receiving node to more quickly analyze the received data, and produce an actionable report based thereon.

In yet another embodiment, the present invention is operable to determine when information must be deleted from the onboard data storage means of the nodes, and to take action to delete same when determined appropriate. In particular, when the system determines that information should be deleted from system data stores, the system broadcasts a command to all neighboring nodes indicating the impending deletion of such information. This broadcasted message includes the data item itself, so that neighboring nodes may either store it or relay it. This function occurs primarily when an existing information item must be discarded in order to make room for a new item that is deemed to be of higher importance. This broadcast, which may be repeated depending on the importance of the information in question, reduces the probability of information being lost, yet allows for the storage of newer data and data of higher importance.

Figure 4:
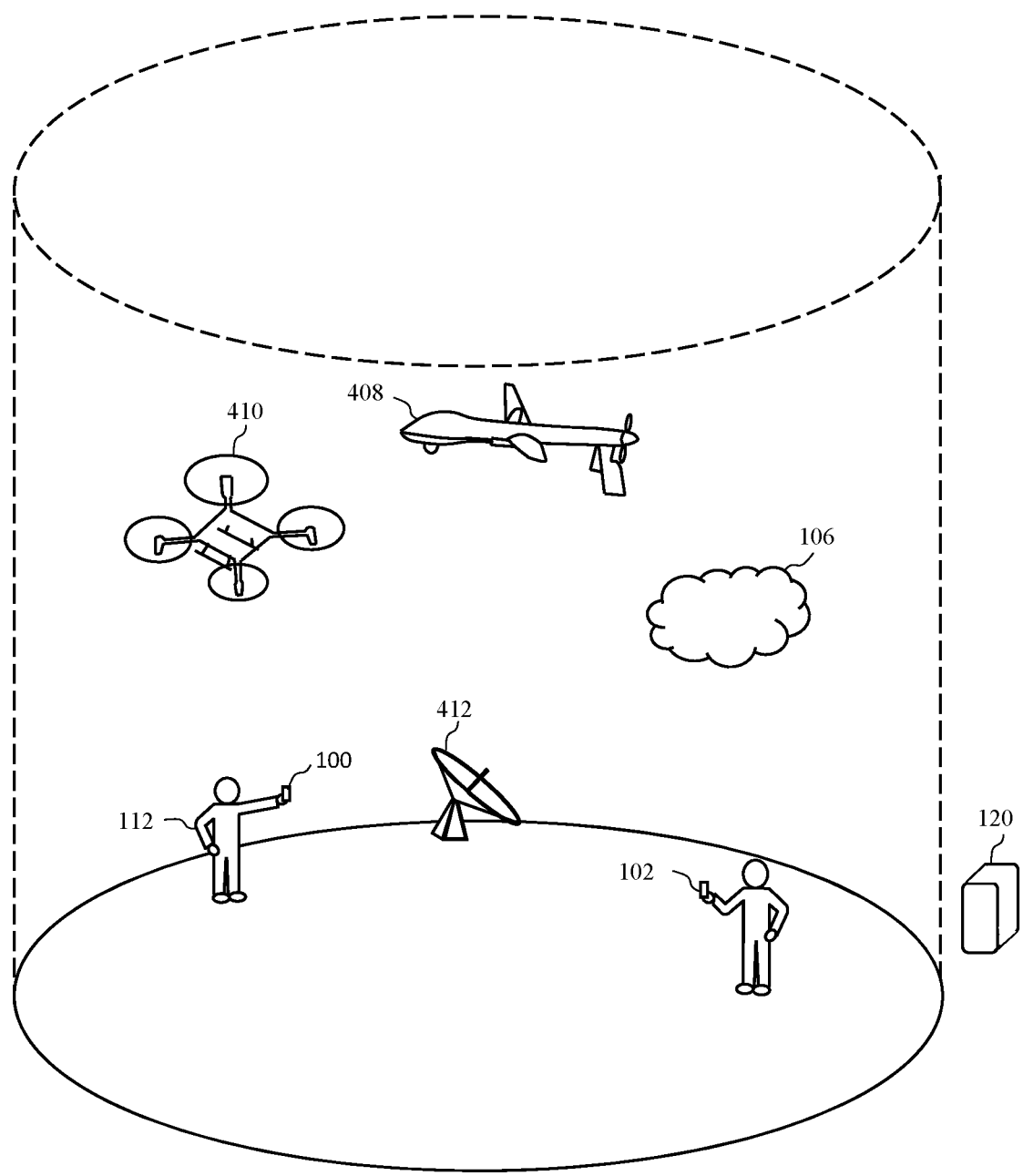
FIG. 4 is an illustration showing the network architecture of a distributed geospatial communications system of FIG. 1 leveraged for monitoring unmanned aerial vehicles, in accordance with the principles of the present invention.

FIG. 4 is an illustration showing the network architecture of a distributed geospatial communications system of FIG. 1 leveraged for monitoring unmanned aerial vehicles, in accordance with the principles of the present invention. FIG. 4 shows an embodiment of the present invention wherein mobile nodes 100-102 interact with each other, as well as data repository 120, over the communications network 106, to identify, track and provide alerts pertaining to UAVs 408 and other such systems. Advantageously, in systems in which a data repository 120 is available and/or communication with a data repository 120 available, the system may function as a hierarchical system. Alternatively, in systems in which a data repository 120 is not available or communication with the data repository 120 is unavailable or intermittent, the system may function as a peer-to-peer network.

The system and methods described above in FIGS. 1-3 may be leveraged to monitor UAVs 408 and other such systems in an area of interest. As described above, while the system is being described in the context of monitoring UAVs 408, the system is not limited to UAVs 408 and may monitor any unmanned vehicle or similar system.

Upon entering a geospatial area, a mobile node 100 may join a dynamically formed network to receive information regarding UAVs 408 and other such systems in that area. For example, in one exemplary embodiment, a user may be a security professional monitoring UAVs 408 in an area as potential threats. Such areas may include military or law enforcement areas of operation, transportation centers such as airports or harbors, or potential targets such as political buildings or events, monuments and crowded public areas or events. In another exemplary embodiment, a user may desire to monitor drones in an area for personal safety or privacy reasons, such as in areas around his residence or public spaces such as a park. In yet another embodiment, a user concerned with potential industrial espionage, remote monitoring and eavesdropping may desire to monitor airspace around a corporate headquarters.

The mobile node 100 may comprise a dedicated device for monitoring UAVs 408 and other such systems or may be a general purpose device such as a mobile phone or tablet computer executing one or more software applications for monitoring UAVs 408 and other such systems. FIG. 4 shows an additional mobile node 102 which may represent any number of additional mobile nodes with the ability to connect to the communications network 106, in addition to the ability to network directly with each other over a wireless radio frequency medium.

UAV 408 is shown hovering above a defined geospatial area. In the context of monitoring UAVs 408, he defined geospatial area may comprise airspace associated with a defined land area or water area.

UAV 408 represents any number of UAVs and other unmanned vehicles which may be resident in the defined geospatial area.

Each UAV 408 comprises pertinent data associated with the UAV 408 which may be useful in monitoring the UAV 408. This data may include identity data, geospatial data and functional data. For example, identity data may further include a UAV type, an owner, a registration status, an origin and destination including time of departure and time of arrival, a time of actual flight and remaining time left before UAV 408 is no longer capable of flight (i.e. exhausts its fuel or power reserve). Geospatial data may further include an altitude, a bearing, a velocity, a flight pattern, a current X-Y-Z position, and time stamp of this information. Function data may include a UAV type, a UAV purpose, and a UAV payload.

Figure 5:
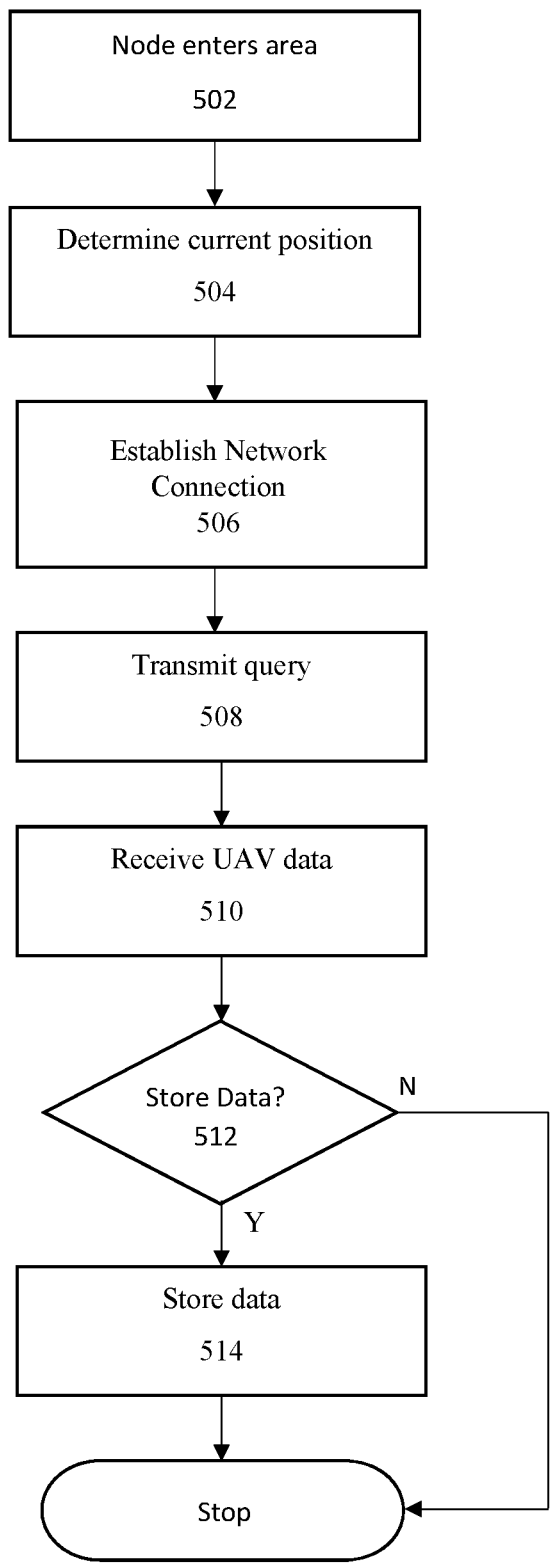
FIG. 5 is a flow chart describing the control flow of the process undertaken by a mobile node when entering a predefined geospatial area in which UAVs are being monitored, in accordance with one embodiment of the present invention.

FIG. 5 is a flow chart describing the control flow of the process undertaken by a mobile node 100 when entering a predefined geospatial area in which UAVs 408 are being monitored, in accordance with one embodiment of the present invention. The flow chart of FIG. 5 is described in association with FIG. 1, which shows an illustration of a block diagram showing the network architecture of a distributed geospatial communications system in accordance with the principles of the present invention and FIG. 4 which shows an illustration showing the network architecture of a distributed geospatial communications system of FIG. 1 leveraged for monitoring unmanned aerial vehicles, in accordance with the principles of the present invention.

FIG. 5 begins with the step 502 wherein a first mobile node, such as node 100, enters the predefined geospatial area in which UAVs 408 are being monitored, such as a predefined land or water area and associated air space.

In step 504, the logic 119 is used to determine the current position of the node 100. In one embodiment, logic 119 reads a location stored by GPS 114 to make the determination of step 504.

Next, in step 506, the node 100 establishes a wireless network connection, using network interface 115, with at least one other mobile node, such as node 102, inside the predefined geospatial area, wherein the wireless network connection is established over the wireless communications network 106. In one embodiment of step 506, the node 100 establishes a network connection exclusively with nodes that are only within the predefined geospatial area.

Next, in step 508, the logic 119 of node 100 transmits, via transmitter 116, a query for pertinent data over the wireless communications network 106 exclusively to the at least one other mobile node, such as node 102, inside the predefined geospatial area.

In one embodiment, the query includes a truth determining mechanism such as authentication information to establish that the first mobile node 100 is authorized to receive the pertinent data. In certain applications, the mobile node 100 may have to establish through the authentication code or truth-determining mechanism that the mobile node 100 has been granted access to receive pertinent data. For example, security restrictions may limit access to the pertinent data. Alternatively, if pertinent data is available for monetary compensation, authorization code or truth-determining mechanism may provide such monetary compensation or proof of prior purchase, such as to a subscription service.

In one embodiment, the term pertinent data refers to data that is associated with the predefined geospatial area and UAVs 408 monitored within the predefined geospatial area. In this embodiment, pertinent data further includes data pertaining to UAVs 408 in the predefined geospatial area including identity data, geospatial data and function data.

In step 510, the node 100 receives, via receiver 117, pertinent data from the at least one other mobile node over the wireless communications network 106.

In step 512, the logic 119 of node 100 determines whether to store the pertinent data that was received, wherein the determination may be on a variety of parameters, such as an amount of free data storage space on the node 100. Additionally, the presence of a prior version of the pertinent data on the node 100 may also be taken into account. Also, the node 100 may decide to delete expired data in data repository 118 of node 100 to make room for the new pertinent data, if the priority of the new pertinent data is higher or the new pertinent data is more pertinent that the expired data. Further, based on the aforementioned parameters, the node 100 may decide to modify parameters for deeming data pertinent, such as shrinking the area of interest represented by the parameters.

In one embodiment, the node 100 may decide to store pertinent data based on a priority level of the data. As will be described further below, the priority level may be based on multiple factors included in or determined from the pertinent data. In situations in which storage space is limited, information pertaining to UAVs 408 associated with a higher threat parameter may be stored whereas information pertaining to UAVs 408 associated with a lower threat parameter may be discarded.

If the determination of step 512 is positive, then the pertinent data is stored in data repository 118 of node 100 in step 514. As will be described further in reference to FIG. 7, it should be noted that node 100 may alternatively interact with dedicated data repository 120 instead of node 102.

Upon leaving an area, node 100 transmits pertinent data to one or more nodes, such as node 102, as shown in FIG. 3, to ensure pertinent data remains resident in geospatial area.

Nodes 100-102, have the ability to determine the priority level of pertinent data and the ability to determine which nodes 100-102 are best suited to relay pertinent data, thereby allowing priority knowledge to be shared expeditiously among the mobile nodes 100-102. In one embodiment, priority level of pertinent data may be determined according to a threat parameter. The threat parameter represents the level of threat that a UAV 408 poses to user and may be based on among other things the type of UAV, the function of UAV, the registration status of UAV and a time criticality according to location, speed and flight pattern.

Also, nodes 100-102 may be configures such that time critical data is transmitted to only a specific designated portion of the system. For example, while some time critical information may need to reach every node 100-102, other information may only pertain to those nodes 100-102 within a particular region or with a specific user profile, and thus that information may only be relayed to those pertinent nodes 100-102. This embodiment enables conservation of valuable bandwidth, and consequently higher transmission speeds throughout the system.

For example, time criticality may be determined according to location, speed and flight pattern of a UAV 408. Using the above criteria, it may be possible to determine a future position of a UAV 408 and transmit pertinent data associated with the UAV 408 to only nodes 100-102 in a predetermined proximity to that future position.

Each information item (e.g., data packet transmitted by a data repository 120 or node 100-102) is tagged with necessary metadata. Such metadata may include, but is not limited to, the criticality of the data (information), the identity and confidence of the data source, the geospatial region and time interval to which the data applies, the time when the data was last updated, and the type of data it is. Such metadata enables the receiving node 100-102 to more quickly analyze the received data, and produce an actionable report based thereon.

Pertinent data may be received by the system from multiple sources. Pertinent data may be volunteered by the UAV 408 itself, transmitted by one or more sensors in the area, input by a monitoring or regulatory agency or input by users themselves. The UAV data may be collected at data repository 120 from one or more of the sources above and cross-referenced, collated or verified. Data repository 120 may further comprise references or databases to cross-reference, collate and verify pertinent data. For example, data repository 120 may further comprise a UAV registry which lists registration information for UAVs 408 received from a monitoring or regulatory agency, a database of registered flights expected in the predefined geospatial area including a UAV registration, a departure time, an arrival time and a flight path, a database of UAV model information which comprises various parameters listed by a type or model of UAV.

The UAV 408 may transmit pertinent data about itself as part of an Identification Friend or Foe (IFF) system. In response to an interrogation query, UAV 408 may transmit pertinent data to node 100-102 or data repository 120. Pertinent data may further comprise information as part of a verification mechanism to mitigate risk of spoofed or otherwise nefarious transmittal of inaccurate data. Alternatively, pertinent data received from UAV 408 may be verified by node 100-102 or data repository 120 by cross-referencing to other information such as a database comprising expected UAVs in geospatial area.

Pertinent data may be provided to the network by a monitoring or other regulatory agency. Such monitoring or regulatory agency may receive pertinent data from UAV owners or operators and provide such information to the network.

In addition, users may enter UAV information into their node 100-102. In one embodiment, the node 100-102 allows for a user to enter UAV information for distribution throughout the network. Upon observing a UAV in the geographic area, a user may enter information into the node 100-102. In one embodiment, the user may enter information via text fields or may upload a photograph or video taken with node 100-102.

When communication with a data repository 120 is available, node 100-102 may transmit information to data repository 120. As described above, data repository 120 may cross-reference to other data to verify or provide associated pertinent data. In one example, a user may identify a UAV which has not been identified by the network and is not being monitored. The user may then take an image of the UAV using a camera incorporated in node 100-102 and upload image to the data repository 120. Image may be a visual image or an image in another spectral range such as an infrared image. Data repository 120 may determine one or more of: a type of UAV based on the physical attributes of the UAV such as size and shape; a registration status of the UAV based on a registration number or other identifying means on the UAV and visible in the image; and a location and bearing of the UAV based on the location of node 100-102, size and orientation of UAV in the image and direction of UAV.

Alternatively, if communication with a data repository 120 is not available, node 100-102 may transmit pertinent data to the network without verifying with data repository 120. Other network users may interact with pertinent data through nodes 100-102, such as to supplement pertinent data with additional data or verify data. For example, other network users may provide pertinent data from another vantage point which may combined with pertinent data to verify, update or increase accuracy of pertinent data.

In addition, pertinent data may be verified by users through nodes 100-102 in a peer monitoring system. For example, users may be able to rate or tag information to ensure that accurate information is shared within network and false information is not spread throughout the network.

Alternatively or in addition, new or existing social networks may be utilized to vet and verify pertinent data submitted by users. For example, pertinent data submitted by a user may be tagged with a reliability parameter based on verification by other users or pre-existing user data, such as previous submissions to network. Additionally, blockchain technology may be leveraged to ensure integrity of information submitted to the system by users. A reliability parameter may be employed to determine criticality of data as described above.

In one embodiment, the network may further comprise a node resident in the area which serves as a local hub node 410 to data repository 120. For example, the local hub node 410 may itself be a UAV resident in the geospatial area. Local hub node 410 may collect information from one or more sources and disseminate throughout network, such as from sensors monitoring the geospatial area, from UAVs themselves as in an IFF system or other sources as identified throughout. The sensors may be either integral to the hub node or external to the hub node, as in radar installations 412 or other similar sensing systems.

Local hub node 410 may communicate with other elements of data repository 120, when available, to transmit information for collation and verification. Alternatively, local hub node 410 may collate and verify when communication with other elements of data repository 120 is unavailable.

The present invention can be realized in hardware, software, or a combination of hardware and software in the system described in the figures above. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allows a computer system to read such computer readable information.

In this document, the terms "computer program medium," "computer usable medium," and "computer readable medium" are used to generally refer to media such as main memory removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for monitoring unmanned vehicles with a plurality of peer-to-peer mobile nodes, the method comprising:
    a first mobile node determining a current location of the first mobile node relative to a predefined geospatial area;
    upon determination by the first mobile node that the current location is situated within the predefined geospatial area, the first mobile node establishing direct wireless communication with a second mobile node of the plurality of mobile nodes;
    the first mobile node requesting pertinent data of the second mobile node, via the established direct wireless communication;
    the second mobile node transmitting pertinent data to the first mobile node, via the established direct wireless communication;
    wherein the pertinent data is associated with one or more unmanned vehicles, distinct from the peer-to-peer mobile nodes, for monitoring the one or more unmanned vehicles resident within the predefined geospatial area; and
    wherein prior to a mobile node exiting the predefined geospatial area, the mobile node transmits the pertinent data to at least one other mobile node via a direct wireless communication thereby ensuring the transmitted pertinent data remains available to each mobile device within the predefined geospatial area.

2. The method of claim 1 wherein the pertinent data associated with one or more unmanned vehicles for monitoring the one or more unmanned vehicles resident within the predefined geospatial area further comprises at least one of identity data associated with an unmanned aerial vehicle, function data associated with an unmanned aerial vehicle and geospatial data associated with an unmanned aerial vehicle.

3. The method of claim 2 wherein identity data associated with an unmanned aerial vehicle comprises at least one of the following: an unmanned vehicle type, an operator and a registration status, an origin, a time of departure, a time of arrival, a time of actual flight and remaining flight time.

4. The method of claim 2 wherein geospatial data associated with an unmanned aerial vehicle comprises at least one of the following: an altitude, a bearing, a velocity and a current X-Y-Z position.

5. The method of claim 2 wherein function information associated with an unmanned aerial vehicle comprises at least one of the following: a capability, a type, a physical attribute and a payload.

6. The method of claim 1 wherein the step of the first mobile node requesting pertinent data of the second mobile node further comprises the first mobile node transmitting an authorization code establishing that the first mobile node has provided monetary compensation.

7. The method of claim 1 further comprising the step of:
the first mobile node determining whether to store the pertinent data based on a threat parameter of the unmanned vehicle associated with the pertinent data.

8. The method of claim 1 further comprising the steps of:
observing an unmanned vehicle within the predefined geospatial area;
determining that the unmanned vehicle is not associated with existing pertinent data;
transmitting pertinent data associated with the unmanned vehicle to one or more mobile nodes of the plurality of mobile nodes.

9. The method of claim 8 wherein the step of transmitting pertinent data associated with the unmanned vehicle further comprises the steps of:
transmitting an image of the unmanned vehicle; and
determining submitted pertinent data from the image of the unmanned vehicle.

10. The method of claim 8 further comprising the step of:
receiving from one or more mobile nodes of the plurality of mobile nodes a verification of submitted pertinent data via a peer monitoring system wherein the one or more mobile nodes associate submitted pertinent data with an accuracy parameter.

11. A network for providing geospatial communications between a plurality of peer-to-peer mobile nodes to monitor unmanned vehicles, the network comprising:
a first mobile node and a second mobile node capable of peer-to-peer communications,
wherein, the first mobile node determines a current location of the first mobile node relative to a predefined geospatial area;
upon determination by the first mobile node that the current location is situated within the predefined geospatial area, the first mobile node establishing direct wireless communication with a second mobile node of the plurality of mobile nodes;
the first mobile node requesting pertinent data of the second mobile node, via the established direct wireless communication and the second mobile node transmitting said pertinent data to the first mobile node via the established direct wireless communication;
wherein the pertinent data is associated with one or more unmanned vehicles, distinct from the plurality of peer-to-peer mobile nodes, for monitoring the one or more unmanned vehicles resident within the predefined geospatial area; and
wherein prior to a mobile node exiting the predefined geospatial area, the mobile node transmits the pertinent data to at least one other mobile node via a direct wireless communication thereby ensuring the transmitted pertinent data remains available to each mobile device within the predefined geospatial area.

12. The network of claim 11 wherein the pertinent data associated with one or more unmanned vehicles for monitoring the one or more unmanned vehicles resident within the predefined geospatial area further comprises at least one of identity data associated with an unmanned aerial vehicle, function data associated with an unmanned vehicle and geospatial data associated with an unmanned vehicle.

13. The network of claim 12 wherein identity data associated with an unmanned aerial vehicle comprises at least one of the following: an unmanned vehicle type, an operator and a registration status, an origin, a time of departure, a time of arrival, a time of actual flight and remaining flight time.

14. The network of claim 12 wherein geospatial data associated with an unmanned aerial vehicle comprises at least one of the following: an altitude, a bearing, a velocity and a current X-Y-Z position.

15. The network of claim 12 wherein function information associated with an unmanned aerial vehicle comprises at least one of the following: a capability, a type, a physical attribute and a payload.

16. The network of claim 11 wherein the step of the first mobile node requesting pertinent data of the second mobile node further comprises the first mobile node transmitting an authorization code establishing that the first mobile node has provided monetary compensation.

17. The network of claim 11 wherein the first mobile node determines whether to store the pertinent data based on a threat parameter of the unmanned vehicle associated with the pertinent data.

18. The network of claim 11 wherein the first mobile node receives pertinent data associated with an observed unmanned vehicle to one or more mobile nodes of the plurality of mobile nodes upon a determination that the unmanned vehicle is not associated with existing pertinent data.

19. The network of claim 18 wherein the first mobile node captures an image of the unmanned vehicle and determines submitted pertinent data from the image of the unmanned vehicle.

20. The network of claim 18 wherein the first mobile node receives a verification of submitted pertinent data from one or more mobile nodes of the plurality of mobile nodes via a peer monitoring system wherein the one or more mobile nodes associate submitted pertinent data with an accuracy parameter.

* * * * *